March 6, 1962  C. R. BOWMAN  3,023,815
BEET ROW THINNER

Filed Jan. 11, 1960  3 Sheets-Sheet 1

Cloyd R. Bowman
INVENTOR.

BY Clarence A. O'Brien
and Harvey B. Jacobson
Attorneys

Cloyd R. Bowman
INVENTOR.

March 6, 1962 C. R. BOWMAN 3,023,815
BEET ROW THINNER

Filed Jan. 11, 1960 3 Sheets-Sheet 3

Cloyd R. Bowman
INVENTOR.

BY Clarence A. O'Brien
and Harvey B. Jacobson
Attorneys

United States Patent Office 3,023,815
Patented Mar. 6, 1962

3,023,815
BEET ROW THINNER
Cloyd R. Bowman, R.F.D. 2, Wilder, Idaho
Filed Jan. 11, 1960, Ser. No. 1,787
5 Claims. (Cl. 172—5)

This invention relates to agricultural machines and more particularly to a crop row thinner.

Briefly, the invention provides a machine to replace hand blocking of sugar beets, lettuce or other row crops. Not only is there a scarcity of men to perform hand blocking operations, hand blocking is inferior to machine block because of the non-uniformity and high cost of processing. Furthermore, hand blocking is slow and laborious.

A machine constructed in accordance with the invention is quite simple from a mechanical standpoint and will serve the intended purpose much more effectively than manual effort.

One of the objects of the invention is to provide a machine which may be used in the same field a second time in order to weed where plants were previously blocked, thereby eliminating hand hoeing of weeds. In other words, a machine in accordance with the invention may be used early in the season for blocking plants, and used at a later date for hoeing the blocked areas.

The machine which exemplifies the invention, is quite small since it is only necessary to block about a foot or foot and a half. Therefore the machine may be made of a suitable frame attached to a tractor in a convenient way. The tractor, as is customary, has a power take-off from which rotational force is obtained in order to provide a source of torque for operating the blocking knife.

There is a plant sensing device carried by the frame of the machine, and it detects the presence of plants by contacting them. Simultaneous with the detection of the plant, an electric circuit is closed which ultimately results in the engagement of a special clutch to operate the blocking knife.

One of the important features of the invention is found in the capability of the machine to operate in all types of soil, for instance good soil or rocky soil. The blocking knife rotates to perform the intended operation, and by simple substitution of different types of blocking knives, not only is there a compensation for different soil types, but also for application of different types of earth-working tools.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
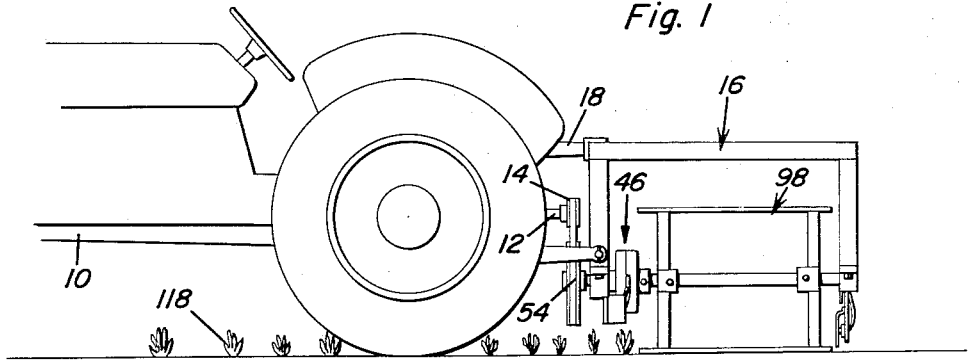
FIGURE 1 is a fragmentary side elevational view of a tractor equipped with a machine in accordance with the invention, this view showing the machine in use.

In the accompanying drawings there is an illustration of a conventional tractor 10 having an equally conventional power take-off 12 to which drive pulley 14 is secured. Machine 16 is secured to the conventional lift and hitch 18 at the rear of the tractor, this is also being a conventional structure on the tractor.

Machine 16 is made of a frame 20 which is simply constructed. It has an upper rectangular sub-frame 22 and a plurality of vertical braces 24 at the four corners thereof. The vertical braces 24 have horizontal cross members 26 at the lower extremities thereof whereby the vertical braces and transverse members 26 form frame sides 28 and 30.

When a three-point lift and hitch structure 18 is used, two lateral hitch pins 32 and 34 at the lower part of side 30 are engaged with the two lower arms of the three-point hitch, and an upper hitch pin 36 attached to the upper part of frame side 30, is connected to the upper arm of the three-point hitch. Other methods of mounting may obviously be resorted to, and furthermore, the machine 16 may be secured to different positions on the tractor, the selection being made in accordance with the type of tractor which the farmer happens to own and other reasons.

Two bearings 40 and 42 are bolted or otherwise secured the lower parts of the sides 28 and 30 of frame 20, and they are used as the structural supports for a shaft assembly 44 which has a clutch 46 interposed therein between its ends. The shaft assembly 44 is composed of two shafts 48 and 50 (FIGURE 3) with shaft 50 being shorter and having a pulley 52 secured thereto. The pulley 52 has drive belt 54 engaged with it, and the drive belt is also entrained around pulley 14. Consequently, shaft 50 is continuously rotated so long as the tractor power take-off shaft 12 is operating. The shaft 48 has a bore 58 in the end thereof which confronts the end of shaft 50, and a rotary pilot pin 60 is mounted in bore 58. Clutch 46 is mounted on shafts 50 and 48 at the juncture thereof.

The clutch 46 has two clutch elements 62 and 64 with the clutch element 62 constructed in the form of a drum having a hub 68 provided with splines 70. There are mating splines 72 on shaft 50 and in engagement with splines 70 so that the clutch element 62 continually rotates with shaft 50 so long as shaft 50 is in a state of rotary movement. A number of circumferentially spaced teeth 74 project radially inwardly from the inner surface of the cylindrical side walls 75 of clutch element 62, and these are engaged by clutch pins 76 and 78 which constitute part of clutch element 64.

Figure 3:
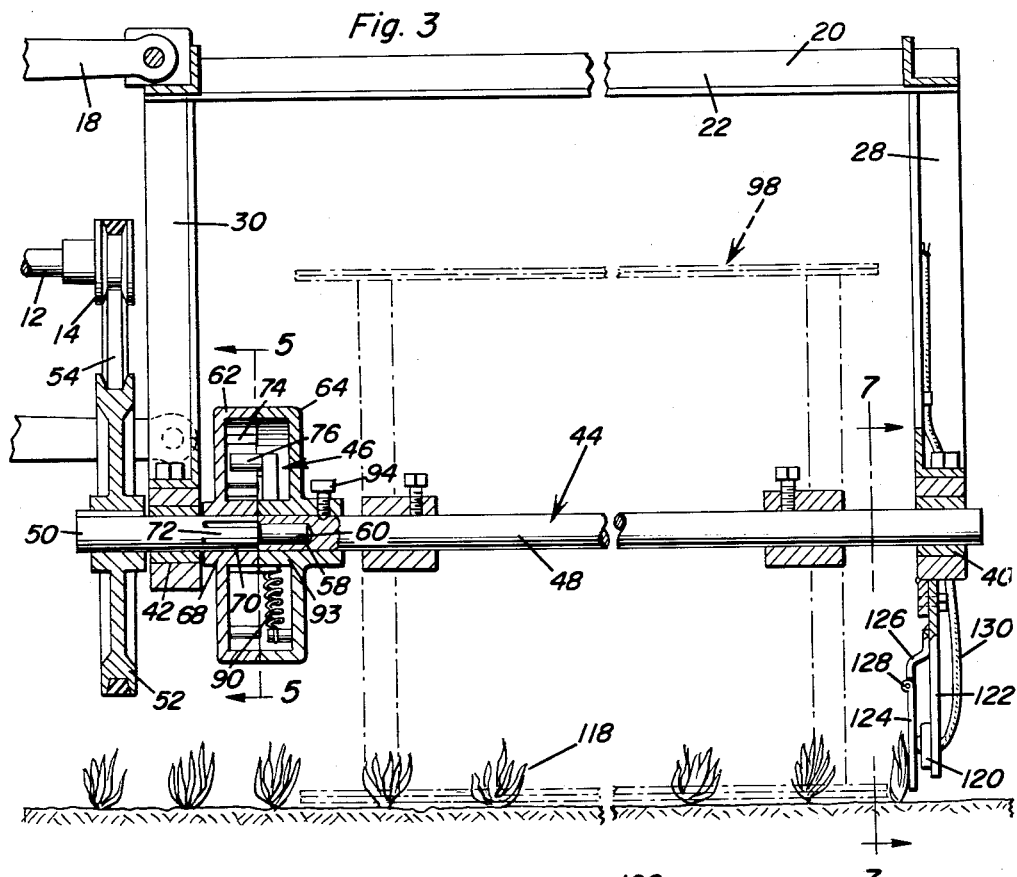
FIGURE 3 is a sectional view on an enlarged scale and taken on the line 3—3 of FIGURE 2.
Figure 7:
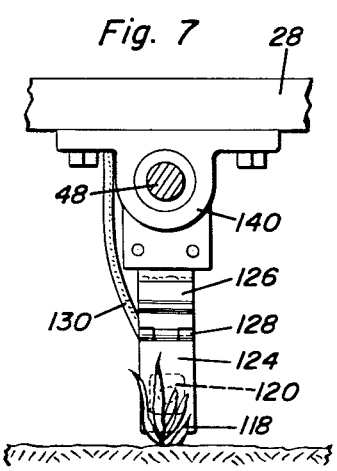
FIGURE 7 is a sectional view taken on the line 7—7 of FIGURE 3.

The clutch element 64 is made of two cranks 80 and 82 which are mounted for rocking movement on spindles 83 and 84. The clutch element 64 is also shaped in the form of a drum and has a cylindrical side wall 85 and a circular backing plate 86. The cylindrical side wall has two slots 87 and 88 (FIGURE 4) diametrically spaced therein, and the clutch arms or cranks 80 and 82 project therethrough. The spindles 83 and 84 are secured to back plate 86, and the cranks 80 and 82 are mounted for pivotal oscillation on the spindles, with the spindles positioning the clutch pins 76 and 78 within the confines of the two drums of the clutch elements 62 and 64. Resilient means opposing the pivotal oscillation of the cranks are connected with the cranks and with back plate 86. The preference for resilient means are tension springs 89 and 90 which are secured, for instance by studs 91, to back plate 86 and which are secured to the cranks 82 and 80 adjacent to but slightly spaced from spindles 83 and 84. As shown in FIGURE 3 clutch element 64 has a hub 93 disposed on shaft 48, and it is secured adjustably thereto, for instance by set screw 94 or some other suitable fastener.

Figure 8:
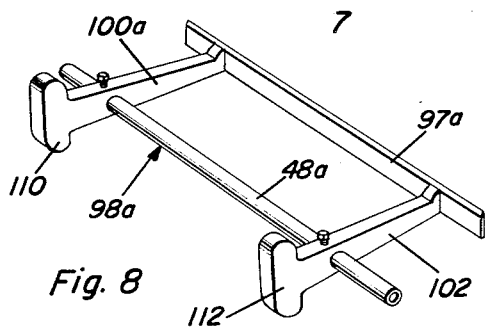
FIGURE 8 is a modification showing a knife which may be used for more difficultly worked soils, for instance rocky soil.

Blocking knife 98 is secured to shaft 48. One form of blocking knife consists of a pair of blades 97 and 99 secured to the outer extremities of arms 100 and 102 which protrude radially from shaft 48. The center portion of each of the arms 100 and 102 is equipped with a hub 103 and 104, and there are fasteners, for instance setscrews 105 and 106 securing the hubs 103 and 104 to shaft 48. The knives 97 and 99 are preferably set at a slight angle to the longitudinal axis of the arms 100 and 102, for example, an angle of approximately 10 degrees. While discussing cutter 98, attention is invited to FIGURE 8 showing cutter 98a. The cutter 98a is shown mounted on shaft 48a and has only a single blade 97a mounted at the ends of radial arms 100a and 102a. The major distinction between cutters 98 and 98a is found in the use of counterweights 110 and 112 in lieu of the second blade. The counterweights provide a heavier cutter to be used in rocky or otherwise difficultly worked soil.

There are means connected with frame 20 for detecting the presence of the plants 118. These means also initiate the operation of an electric circuit constituting a portion of machine 16. The plant detection and circuit closing means consists of switch 120 suspended from a hanger 122 which is secured to and which depends below the side 28 of frame 20. A switch actuating arm 124 is carried by bracket 126 that is attached to hanger 122. The arm 124 preferably has a hinge 128 connecting it to bracket 126, and if found desirable or necessary, a light torsion spring may be included with hinge 128 to prevent inadvertent operation of switch 120 by arm 124. When the switch arm 124 contacts one of the plants 118 the arm 126 is deflected to such a position that switch 120 is actuated.

An electric cable 130 extends from switch 120 and is secured to a solenoid 132. The solenoid is supported by mounting plate 134 which is welded or otherwise secured to a part of frame 20 near side 30 thereof. The solenoid and switch are connected together with a source of electrical potential (not shown) to form an operative electric circuit under the control of switch 20.

Clutch release rod 136 is supported by bearings 138 and 140, and the bearings are attached to plate 134. Links 142 mechanically connect rod 136 with the armature of solenoid 132 so that upon energization of the solenoid, the armature together with rod 136 are retracted.

Figure 2:
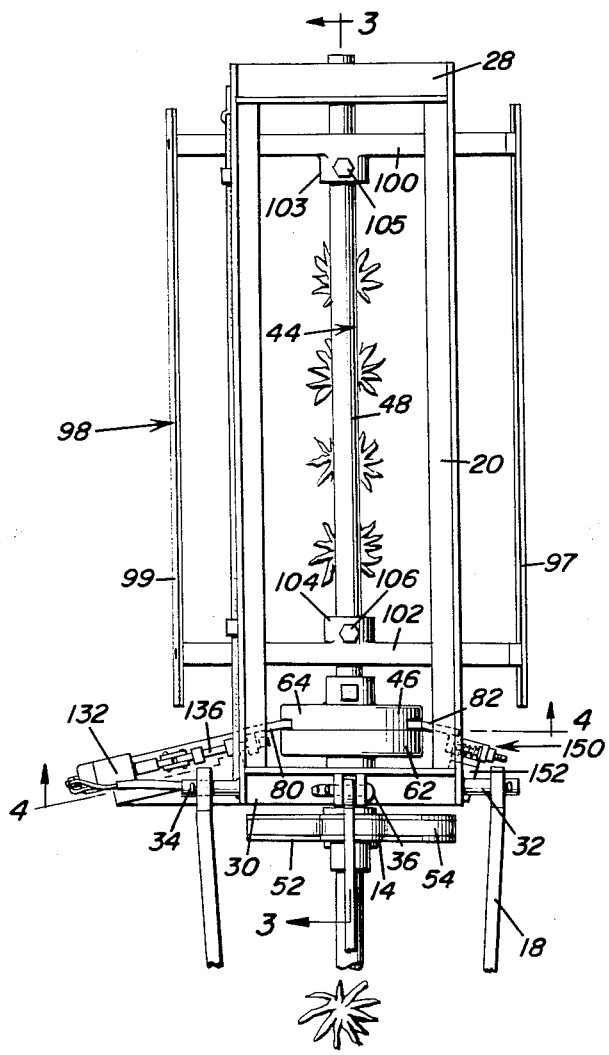
FIGURE 2 is a fragmentary, large scale top view of the machine shown in FIGURE 1.
Figure 4:
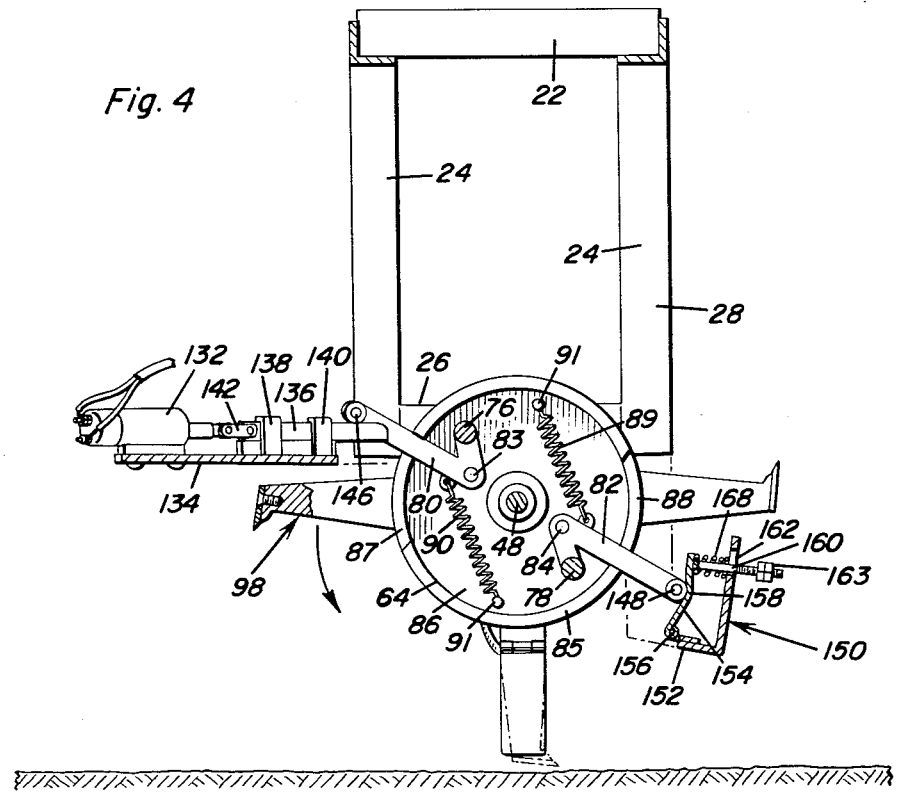
FIGURE 4 is an enlarged sectional view taken on the line 4—4 of FIGURE 2.
Figures 5, 6:
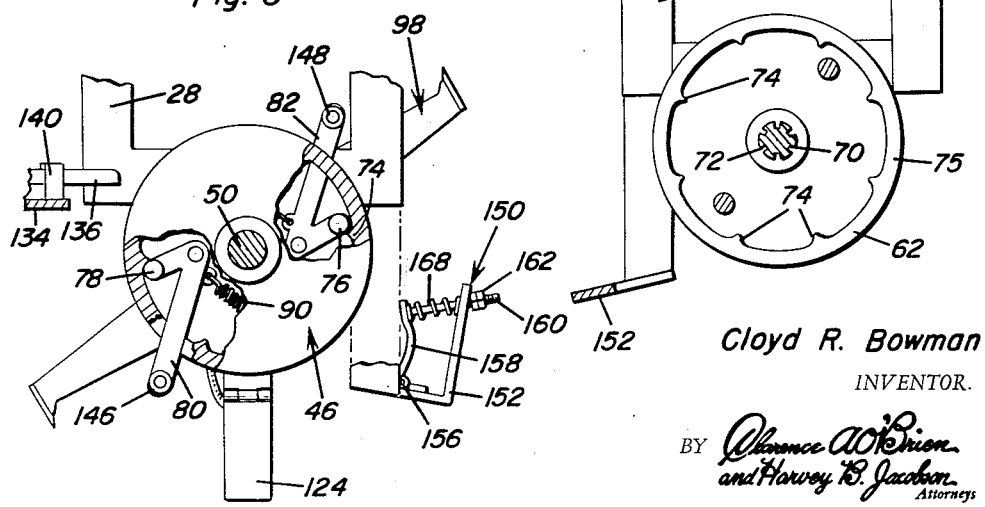
FIGURE 5 is a sectional view taken on the line 5—5 of FIGURE 3.
FIGURE 6 is a fragmentary elevational view, parts being broken away in section, and showing the clutch in engagement and the blocking knife as it would appear during a single cycle of operation.

As shown best in FIGURES 4 and 6, the cranks 80 and 82 are held in a normal position at which the clutch pins 76 and 78 are withdrawn from teeth 74. The outer extremities of the cranks 80 and 82 have laterally projecting rollers 146 and 148 thereon. Roller 146 (FIGURE 4) rests upon the upper surface of rod 136 which holds the crank in such position that spring 90 is tensioned, and the clutch pin 76 is separated from all of the clutch teeth 74. Crank 82 is held in such position that clutch pin 78 is disengaged from teeth 74, by a crank actuating device 150 carried by a bracket 152 which is secured to the side 30 of frame 20 (FIGURE 2). Device 150 is made of a plate 154 connected by hinge 156 at its lower edge to bracket or plate 152. The arm 154 has a depression 158 therein intermediate its ends and forms a pocket for roller 148. The upper end of the plate or arm 152 has a bolt 160 fixed thereto, and the bolt extends through a slot 162 formed in an upstanding flange of mounting bracket 150. Nuts 163 on the bolt 60 form adjustable stops to limit the excursion of arm 154. A spring 168 concentrically mounted on bolt 150 bears against plate 154 and a surface of the bracket 152 adjacent to slot 162 therein. The spring 158 functions as a cushion inasmuch as clutch element 62 continually rotates, but clutch element 64 only intermittently rotates i.e. when pins 76 and 78 are engaged with the teeth 74, the position of the cranks 80 and 82 shown in FIGURE 4 is achieved when the clutch element 64 has rotated.

The operation of the machine is as follows: After it is secured to a typical tractor and the tractor moved to the field, the tractor wheels are placed in the water rows between row crops. Then, as the tractor is propelled, machine 16 is moved with it. As the plant detecting device engages one of the plants 118, the electric circuit is energized thereby causing the rod 136 to be withdrawn from the position shown in FIGURE 4. This releases crank 80 so that spring 90 may oscillate the crank and bring pin 76 into engagement with one of the teeth 74. This action results in the coupling of clutch elements 62 and 64 and the consequent rotation of shaft 48 of shaft assembly 44. Therefore the cutter 98 rotates and performs a blocking operation. As the clutch element 62 rotates in a direction of the arrow shown in FIGURE 4, the crank 80 engages device 150 causing the crank 80 to be pivotally oscillated against the yielding opposition of spring 90 so that crank 80 assumes the position of crank 82 shown in FIGURE 4. This disengages crank 80 i.e. separates clutch pin 76 from the tube 74 with which it was previously engaged. At the same time the crank 82 will have moved to the position formerly occupied by crank 80 (FIGURE 4), at which the roller 148 will bear against the top surface of rod 82 causing the crank 82 to be pivotally oscillated against the yielding opposition of spring 89. The result is that the clutch pin 78 becomes disengaged from tooth 74. By this time the tractor will have moved a predetermined distance in the field, depending on the forward rate of travel of the tractor, and another plant 118 will be contacted to initiate a cycle of operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A row crop thinning machine adapted to be mounted on a tractor, said machine comprising a frame, a shaft assembly carried by said frame and including a first and second shaft respectively, an intermittently operated clutch interposed between said first and second shafts, a cutter carried by said second shaft, and means carried by said frame for detecting plants in a row and for initiating a cycle of operation of said clutch to thereby actuate said second shaft, said initiating means including an actuator, a switch controlling said actuator, means connected between said actuator and said clutch to control the operation of said clutch, and means carried by said frame and arranged adjacent to said switch for contacting a plant and moving and thereby operating said switch, said means connected with the actuator for controlling the operation of said clutch including a rod, means mounting said rod for constrained movement in response to actuation of said actuator, said clutch including a pair of clutch elements, one of said clutch elements secured to said first shaft, the other of said clutch elements secured to said second shaft, a crank, means carried by said other of said clutch elements oscillatably mounting said crank, drive means connected between said crank and said one of said clutch elements and engaged between said clutch elements in response to oscillation of said crank.

2. The subject matter of claim 1 wherein there is a spring connected with said crank and reacting thereon to oscillate said crank when said rod is withdrawn from contact with said crank, said drive means including a clutch pin connected with said crank and a plurality of teeth constituting a part of one of said clutch elements and with which said drive pin is engageable upon release of said rod from said crank, and said spring propelling said crank to bring said clutch pin in engagement with said teeth.

3. The subject matter of claim 2 wherein there is a second crank having a clutch pin adapted to engage said teeth, and a second spring connected to said second crank and yieldingly biasing said second crank to propel said second crank in a direction to bring said second clutch pin in engagement with said teeth.

4. The subject matter of claim 3 wherein there is a device carried by said frame and engaged by said cranks as said cranks are rotated with said clutch elements, said device providing an abutment to oscillate said cranks in a direction to separate the clutch pins thereof from said teeth.

5. The subject matter of claim 2 wherein there is a device carried by said frame and engaged by said crank as said crank is rotated with said clutch element, said device providing an abutment to oscillate said crank in a direction to separate the clutch pin thereof from said teeth.

References Cited in the file of this patent

UNITED STATES PATENTS

| | | |
|---|---|---|
| 886,179 | Branunier et al. | Apr. 28, 1908 |
| 1,303,798 | Janes | May 13, 1919 |
| 2,544,036 | McCann | Mar. 6, 1951 |